United States Patent Office 3,468,618
Patented Sept. 23, 1969

3,468,618
PROCESS FOR DYEING AND PRINTING FIBROUS MATERIALS
Arthur Buehler, Rheinfelden, Georg Sulzer, Basel, and Alfred Fasciati, Bottmingen, Switzerland, assignor to Ciba Limited, Basel, Switzerland, a Swiss company
No Drawing. Continuation-in-part of application Ser. No. 174,709, Feb. 21, 1962. This application Feb. 1, 1965, Ser. No. 429,624
Claims priority, application Switzerland, Feb. 24, 1961, 2,271/61
Int. Cl. D06p *3/68, 3/12*
U.S. Cl. 8—17                  10 Claims

ABSTRACT OF THE DISCLOSURE

Leather, paper, and glass, cellulose, cellulose acetate, polyamide, polyurethane, polyacrylonitrile and polyester fibers are dyed with a mixture of (1) an aminoplast precursor, such as urea-formaldehyde resins, lower alcohol modified methylol ureas, and methylol ethylene ureas, (2) an acid catalyst, and (3) a 1:2 chrome or 1:2 cobalt complex of an azo dye containing at least 2 sulfonic acid groups and no substituents reacting with the aminoplast. Sulfonated azo benzenes and azo naphthalene as well as azo-naphthols, dihydroxy azo-quinolines, azopyrazolones and azo-barbituric acid metallized with chrome salicylate and acetate or cobalt tartrates, acetates or sulfates are the dyes used in this process.

---

This is a continuation-in-part of our copending application Ser. No. 174,709, filed Feb. 21, 1962.

It has been found that fibrous materials can be dyed or printed in a valuable manner by treating them with an aqueous preparation containing (1) a 1:2-chromium or a 1:2-cobalt complex of an azo dyestuff which contains at least two sulfonic acid groups wherein each of the two dyestuff molecules contains at least one sulfonic acid group, and which complexes do not form covalent bonds with either the fibrous material or the aminoplast, and (2) an aminoplast, that is at least dispersible in water, and (3) an acidic catalyst and then during the fibrous material so treated.

The process can be applied to a very wide variety of fibrous materials, such as leather, paper, glass fibers and more especially to textile materials. Like acetylcellulose, polyamide, polyurethane, polyacrylonitrile or polyester fibers the textile fibers may have been manufactured synthetically or semi-synthetically.

The present process yields particularly good results in dyeing and printing cellulose fibers, for example fibers of regenerated cellulose such as viscose rayon or above all spun rayon, and preferably fibers of native cellulose, such as linen and cotton.

The metal complexes to be used in the present process contain as the metal bound in complex union chromium or cobalt. One heavy-metal atom is bound in complex union to two molecules of one and the same dyestuff, or to one molecule each of two different dyestuffs. The dyestuffs may contain one or more than one azo linkage. Each dyestuff molecule participating in the complex formation must contain at least one sulfonic acid group. The whole metal complex molecule must therefore contain at least two sulfonic acid groups, but may also contain more than two, for example three or four such groups.

Such complex dyestuffs are no direct cotton dyestuffs and are not to be used for dyeing wool or silk either, unless combined with a suitable assistant. They are, therefore, not to be classed with so-called cotton or wool dyes, because the dyeings are weak and skittery and, in consequence, useless.

The metal complexes must not contain substituents capable of forming covalent bonds with the fibrous material and/or the aminoplast under the conditions used for dyeing or printing. Thus, for example, the dyestuff molecule must be free from carboxylic acid amide, sulfonamide, urea, aminotriazine and aminoaryl groups, nor may it contain halogentriazine or chloropropionyl radicals, to mention only a few groups that are capable of forming a covalent bond with aminoplasts or with fibrous materials, such as cellulose fibers.

On the other hand, the dyestuffs may contain in addition to the groups capable of forming metal complexes and the sulfonic acid group or groups other substituents, for example alkyls such as methyl, aromatically bound hydroxyl groups or halogen atoms, such as chlorine, or alkoxy groups such as ethoxy or methoxy, or nitro groups.

Examples of complex-forming groups present in the dyestuffs are orthocarbomethoxy - ortho' - hydroxyazo, ortho - carboxy-ortho'-hydroxyazo, ortho-carboxy-ortho'-aminoazo, ortho-hydroxy-ortho'-aminoazo or preferably ortho-ortho'-dihydroxyazo groupings.

Advantageous results are obtained, for example, with 1:2-chromium or cobalt complexes that consist of two dyestuff molecules of the formula

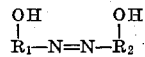

wherein $R_1$ and/or $R_2$ contain at least one sulfonic acid group and in which (a) $R_1$ represents a benzene radical which is bound to the azo linkage in ortho-position relatively to the hydroxyl group, and $R_2$ represents a naphthalene radical which is bound to the azo linkage in vicinal position relatively to the hydroxyl group and is substituted, if desired, by a further hydroxyl group; or (b) $R_1$ and $R_2$ each represents a naphthalene radical which is bound to the azo linkage in vicinal position relatively to the hydroxyl group; or (c) $R_1$ represents a benzene radical bound to the azo linkage in vicinal position relatively to the hydroxyl group or a naphthalene radical, and $R_2$—OH represents the radical of a 5-pyrazolone which is bound to the azo linkage in position 4.

The azo dyestuffs required for the preparation of the metal complexes can be manufactured in known manner from known diazo and coupling components. Incidentally, a large variety of such azo dyestuffs has been known as chroming dyestuffs for a long time. For the preparation of such azo dyestuffs there are suitable, for example, ortho-hydroxyamines and ortho-carboxyamines of the benzene and naphthalene series; as coupling components there are suitable aminonaphthalenes capable of coupling in vicinal position relatively to an amino group, or hydroxybenzenes, hydroxynaphthalenes, 2:4-dihydroxyquinolines, pyrazolones or barbituric acid capable of coupling in vicinal position relatively to a hydroxyl group, or to an enolizable keto group respectively.

The 1:2-complexes to be used in the present process can likewise be prepared in the usual manner from metal-free monoazo dyestuffs, advantageously by the methods known for the manufacture of 1:2-metal complexes not containing groups imparting solubility in water. For the manufacture of symmetrical complexes (in which the metal atom is bound to two identical dyestuff molecules) it is of advantage to treat the dyestuffs in a manner and with metal donors (for example alkali metal chromosalicylate, chromium acetate, sodium-cobalt tartrate, cobalt acetate or sulfate) such as give direct rise to the desired complex. This procedure includes also the chroming with alkali metal bichromate in the presence of a reducing agent.

For the manufacture of asymmetrical complexes it is in general advantageous to use a different method to ensure the formation of unitary products, instead of mixtures having a substantial content of symmetrical by-products of which some contain no solubilizing groups at all and are, therefore, undesirable. In such a case it is of advantage to prepare from one of the two dyestuffs used for the synthesis of the asymmetrical 1:2-complex the 1:1-chromium complex which is then reacted with the other metal-free dyestuff. In this connection it should also be mentioned that the 1:1-complexes of ortho:ortho'-dihydroxyazo dyestuffs can be prepared not only from the ortho:ortho'-dihydroxyazo dyestuffs themselves but also from the corresponding ortho-hydroxy-ortho'-alkoxyazo dyestuffs. Accordingly, such 1:1-complexes to be used for conversion into 1:2-complexes may be prepared not only from the ortho-hydroxydiazo compounds but equally well from the corresponding ortho-alkoxydiazo compounds, more especially from the methoxy compounds.

Under certain circumstances the processing of the 1:2-complexes may cause difficulties since these compounds are very readily soluble in water. Complexes, that cannot be salted out for that reason, can be isolated by evaporating the reaction mixture, or by other suitable methods, such as addition of certain water-miscible organic solvents.

The aqueous preparations to be used in the present process contain in addition to the metal complexes also aminoplasts that are at least dispersible in water—either as such or, if necessary, with the aid of a dispersant—or preferably such as are soluble in water; the solubility in water need not be unlimited—in fact there are also suitable aminoplasts that give a unitary aqueous solution only in certain proportions.

In other respects, any aminoplast may be used, such as a urea resin or more especially a melamine resin.

Inter alia, there are suitable for example urea-formaldehyde resins which may be derived from methylol-ureas from 1 molecular proportion of urea and 2 to 4 molecular proportions of formaldehyde, or from the alkyl ethers of said methylol compounds with lower alcohols, such as methanol or n-butanol. Only some of the methylol groups present in the molecule need be etherified. As further relevant examples there may be mentioned methyl ethers of methylolethylene-ureas and methylolacetyl-ureas and their methyl ethers.

Furthermore, there are suitable condensation products of formaldehyde with compounds which, like dicyandiamide or melamine, contain at least one atomic grouping of the formula

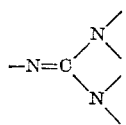

or which, like cyanamide, are easy to convert into such compounds.

The formaldehyde condensation products to be used in the present process may be derived from a very wide variety of cyclic or non-cyclic compounds containing the aforesaid atomic grouping. As non-cyclic compounds there may be mentioned, for example, dicyandiamide, dicyandiamidine, guanidine, acetoguanidine and biguanide. Suitable condensation products are, for example, those prepared with the use of more than 1, for example 2 to 4 or more, molecular proportions of formaldehyde for every molecular proportion of the compound containing at least one atomic grouping

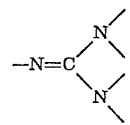

The condensation products may have been prepared in a neutral, alkaline or acidic medium.

The condensation products of formaldehyde with cyclic compounds which contain at least one atomic grouping

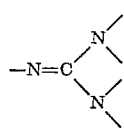

and which are advantageously used in the present process are preferably derived from aminotriazines. There are suitable methylol compounds of aminotriazines or their ethers or esters. From among these compounds there may be mentioned above all reaction products of formaldehyde with 2:4:6-triamino-1:3:5-triazine, generally called melamine. Such condensation products may contain 1 to 6 methylol groups, and as a rule they are mixtures of different compounds. The preferred embodiment is a highly methylated, water-soluble hexamethylolmelamine. Highly methylated means in this connection that at least four methylol groups of the hexamethylolmelamine are etherified with methanol. Further suitable are methylol compounds of such derivatives of melamines as contain at least one amino group, for example methylol compounds of melam, melem, ammeline, ammelide or of halogen-substituted aminotriazines such as 2-chloro-4:6-diamino-1:3:5-triazine; also methylol compounds of guanamines such, for example, as benzoguanamine, acetoguanamine or formoguanamine.

Furthermore, the present process may be performed with condensation products of formaldehyde with guanyl-melamine. Such condensation products may be derived from mono-, di- or tri-guanylmelamines or mixtures thereof such as are obtained by treating dicyandiamide in an inert solvent at an elevated temperature with a gaseous hydrogen halide, the free amines then being liberated from the salts so formed by addition of strong alkali solutions. Substituted guanylmelamines are likewise suitable for the manufacture of formaldehyde condensation products.

The salts of the formaldehyde condensation products, which may be used as alternatives to the free basic condensation products, may be derived from inorganic acids, such as hydrochloric or sulfuric acid, or from organic acids, more especially lower aliphatic acids, such as formic, acetic, propionic or glycollic acid.

In addition to the aminoplasts the aqueous preparations to be used in the present process may contain further substances, for example softeners for the textile material. For example, a latex of a polymerization plastic may be added. Particularly suitable are lattices that contain groups capable of undergoing cross-linking with the aminoplasts. The polymers may be homopolymers or copolymers. They are advantageously derived from monomers containing the atomic grouping

for example from vinyl esters of organic acids, such as vinyl acetate, vinyl formate, vinyl butyrate or vinyl benzoate, or from vinylalkyl ketones, vinyl halides such as vinyl chloride, vinyl fluoride or vinylidene chloride, from vinylaryl compounds such as styrene or substituted styrenes;

furthermore from compounds of the acrylic acid and methacrylic acid series, such as esters of acrylic acid and alcohols or phenols, for example ethyl acrylate, butyl acrylate or dodecyl acrylate. Further monomeric compounds suitable for the formation of polymers, are acrylonitrile, acrylamide and its derivatives substituted at the amide nitrogen; also analogous derivatives of methacrylic acid, α-chloracrylic acid, crotonic acid, maleic acid or fumaric acid, or acrylic acid or methacrylic acid itself; finally polymerizable olefines such as isobutylene, butadiene, 2-chlorobutadiene or heterocyclic compounds such as the different vinylpyridines. Methods suitable for the manufacture of binary, ternary or even higher copolymers in the form of emulsions are known and need not be discussed in detail in this connection. A few suitable copolymers are listed below:

(1) Copolymer from 50 parts of n-butylacrylate, 40 parts of vinyl chloride and 6 parts of acrylic acid;

(2) Copolymer from 66 parts of n-butylacrylate, 12 parts of styrene and 22 parts of vinylisobutyl ether;

(3) Copolymer from 64 parts of ethylacrylate, 12 parts of styrene, 22 parts of vinylisobutyl ether and 2 parts of acrylic acid;

(4) Copolymer from 70 parts of asymmetrical dichloroethane and 30 parts of butylacrylate;

(5) Copolymer from 56 parts of butylacrylate, 40 parts of vinyl chloride and 4 parts of acrylic acid;

(6) Copolymer from 50 parts of asymmetrical dichloroethane, 45 parts of butylacrylate and 5 parts of acrylamide; and (7) Copolymer from 52 parts of vinyl chloride, 35 parts of butylacrylate, 7 parts of methylacrylate and 6 parts of acrylamide.

Likewise suitable are commercial copolymers of styrene and butadiene, and of acrylonitrile and butadiene.

The aqueous preparation may, of course, contain one or more than one latex component in addition to one or more than one aminoplast, for example a dispersed derivative, which is insoluble in water but soluble in organic solvents, of a formaldehyde condensation product of an amino compound that forms with formaldehyde curable resins and a water-soluble formaldehyde condensation product of an amino compound that forms curable resins with formaldehyde.

Finally, the aqueous preparations contain also an acidic catalyst such as ammonium sulfite, ammonium chloride, diammonium phosphate, ethanolamine hydrochloride, zinc nitrate, zinc fluoborate or ammonium silicofluoride.

The aqueous preparations can be applied to the fibrous materials in usual manner, advantageously at room temperature or at a moderately higher temperature, for example at 10 to 40° C. The present process is particularly suitable for continuous operation, for example for printing fabrics by the roller printing method or for impregnating on a padder.

The impregnating liquor may contain as further additives, for example wetting or dispersing agents. The printing pastes may contain the conventional thickeners such as starch, tragacanth or methylcellulose, as well as further additives, such as hydrotropic agents, for example urea.

The proportions of dyestuffs and aminoplasts to be used in the present process, as well as the proportions of any further incorporated additives may vary within wide limits. The amount of dyestuff depends substantially on the desired tinctorial strength. The proportion of aminoplast should in general not be less than that of the dyestuff, and as a rule it is of advantage to select the proportions so that the amount of aminoplast is several times the amount of dyestuff used, or there should be used preparations that contain in 1000 parts about 20 to 200 parts of aminoplast.

The fibrous material is impregnated with the preparation containing the dyestuff and the aminoplast and then cured. Before curing the material it is of advantage to dry it, advantageously at room temperature or by heating it to a temperature at which as yet no appreciable curing takes place, for example to a temperature below 100° C.

In the case of textile materials of regenerated cellulose it is in general of advantage not to dry the dyeings or prints immediately after application of the dye preparation but to let the moist material lie for some time, for example for 1 to 6 hours. In this manner dyeings and prints are obtained which generally are of stronger and/or more even shades.

Curing is advantageously performed with the use of the conventional apparatus which may be, but need not be, equipped with a nozzle unit, by simple heating to the requisite temperature which may range, for example from 120 to 180° C., or over. Curing may also be performed with the use of infra-red heaters. Depending on the manner of heat treatment applied, very short heating times, for example from 10 to 30 seconds, may suffice. Finally, it is also possible to cure without any pre-drying at all, that is to say to dry and cure at the same time.

Depending on the properties and amount of the aminoplast used, and depending on whether the aqueous preparation contains further ingredients, there may be produced by the present process additional effects, such as crease resistance, shrink resistance, permanent calender effects, modifications of the handle of the textiles and water repellency.

To remove any unfixed dyestuff, catalyst and other unfixed substances it is of advantage to soap the cured fibrous material in usual manner, for example by treating it at 40 to 80° C. in a solution containing soap, or soap and sodium carbonate or a synthetic detergent, for example an ethylene oxide adduct of a para-alkylphenol or sodium 2 - heptadecyl - N - benzyl-benzimidazoledisulfonate. The dyeings and prints produced by the present process are distinguished by their good wet fastness, more especially by good fastness to washing.

Unless otherwise indicated, parts and percentages in the following examples are by weight.

EXAMPLE 1

A mercerized cotton fabric is treated on a padder with an aqueous solution containing in 1000 parts by volume 20 parts of the 1:2 cobalt complex of the dyestuff of the formula

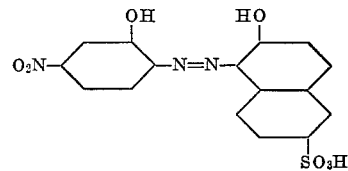

135 parts of an aqueous solution of 75% strength of highly methylated hexamethylolmelamine and 4 parts of ammonium chloride. The fabric is then squeezed until its weight shows an increase of 65 to 70%, dried in air at room temperature and then cured for 6 minutes at 155 to 160° C. The fabric is then washed for 5 minutes at 50° C. in a solution containing per liter of water 2 grams of an adduct of 9 mols of ethylene oxide with 1 mol of nonylphenol, and 2 grams of anhydrous sodium carbonate. The fabric is dyed a violet shade, and the dyeing is distinguished by very good fastness to washing and light.

When 20 parts of an aqueous polyethylene emulsion of 20% strength are further added to the padding liquor, the dyed fabric has a softer handle.

EXAMPLE 2

The procedure is as described in Example 1, except that the cobaltiferous dyestuff mentioned in that example is replaced by one of the 1:2-metal complexes listed below which can be prepared in the usual manner.

The Table A lists 1:2-complexes in which 2 molecules of one and the same dyestuff are bound to one atom of metal in complex union.

TABLE A

| | Metal | Dyestuff | Shade on cotton |
|---|---|---|---|
| 1 | Co | [structure: 4-nitro-2-hydroxy-5-sulfophenyl–N=N–2-hydroxy-5-tert-butylphenyl] | Brown. |
| 2 | Co | [structure: 4-nitro-2-hydroxyphenyl–N=N–1-hydroxy-6-sulfo-2-naphthyl] | Violet-brown. |
| 3 | Cr | [structure: 1-hydroxy-4-sulfo-2-naphthyl–N=N–1-hydroxy-5-sulfo-2-naphthyl] | Navy. |
| 4 | Cr | [structure: 1-hydroxy-4-sulfo-7-nitro-2-naphthyl–N=N–1-hydroxy-2-naphthyl] | Grey. |
| 5 | Cr | [structure: 2-carboxyphenyl–N=N–pyrazolone with 2,5-dichloro-4-sulfophenyl] | Yellow. |
| 6 | Co | [structure: 4-sulfo-2-hydroxy-5-nitrophenyl–N=N–pyrazolone-N-phenyl] | Yellow-brown. |
| 7 | Co | [structure: 2-hydroxy-5-sulfophenyl–N=N–pyrazolone-N-(4-sulfophenyl)] | Do. |
| 8 | Cr | [structure: 2-hydroxy-5-sulfophenyl–N=N–pyrazolone-N-(4-sulfophenyl)] | Orange. |
| 9 | Cr | [structure: 1-hydroxy-4-sulfo-2-naphthyl–N=N–pyrazolone-N-(4-sulfophenyl)] | Red. |
| 10 | Cr | [structure: 4-sulfo-2-hydroxy-5-chlorophenyl–N=N–pyrazolone-NH with COOH] | Red. |

TABLE A.—Continued

| | Metal | Dyestuff | Shade on cotton |
|---|---|---|---|
| 11 | Co | (structure) | Reddish brown. |
| 12 | Cr | (structure) | Red. |
| 13 | Cr | (structure) | Red. |
| 14 | Co | (structure) | Reddish brown. |
| 15 | Cr | (structure) | Greyish brown. |
| 16 | Cr | (structure) | Bluish grey. |
| 17 | Cr | (structure) | Grey. |
| 18 | Cr | (structure) | Orange. |
| 19 | Cr | (structure) | Red. |
| 20 | Co | (structure) | Greyish green. |

TABLE A.—Continued

| | Metal | Dyestuff | Shade on cotton |
|---|---|---|---|
| 21 | Co | (structure: O₂N–phenyl(OH)–N=N–phenyl(H₂N)(SO₃H fused ring)) | Blue. |
| 22 | Co | (structure: HO₃S–naphthyl(OH)–N=N–naphthyl(OH)(SO₃H)) | Violet. |

The following Table B lists 1:2-complexes containing 1 molecule each of two different dyestuffs bound to one atom of metal.

Instead of the highly methylated hexamethylolmelamine there may be used 200 parts of an aqueous solution of 50% strength of tetramethylol acetylene diurea and the resulting dyestuffs are likewise fast to washing.

TABLE B

| | Metal | First Dyestuff | Second Dyestuff | Shade on cotton |
|---|---|---|---|---|
| 1 | Cr | (pyrazolone azo dye with O₂N, OH, SO₃H) | (pyrazolone azo dye with Cl, OH, SO₃H) | Brownish red. |
| 2 | Cr | (HO₃S, OH, O₂N azo naphthol) | (HO₃S pyrazolone with Cl) | Brown. |
| 3 | Cr | (HO₃S, OH, O₂N azo naphthol) | (O₂N pyrazolone with SO₃H) | Do. |
| 4 | Cr | (HO₃S, OH azo naphthol SO₃H) | (Cl, OH azo naphthol SO₃H) | Blue. |
| 5 | Cr | (HO₃S, OH azo naphthol) | (O₂N, Cl, OH azo naphthol SO₃H) | Do. |
| 6 | Cr | (O₂N, OH, H₂N, SO₃H) | (O₂N, O₂N, OH, H₂N, SO₃H) | Olive. |
| 7 | Co | (Cl, OH, SO₃H azo) | (O₂N pyrazolone with SO₃H) | Brown. |

TABLE B.—Continued

| Metal | First Dyestuff | Second Dyestuff | Shade on cotton |
|---|---|---|---|
| 8 ..... Cr | OH, HO, Cl, SO₃H (azo) | OH, HO, O₂N, SO₃H (azo) | Violet. |
| 9 ..... Cr | OH, HO, Cl, SO₃H (azo) | OH, HO, O₂N, SO₃H (azo) | Violet-brown. |
| 10 .... Cr | OH, HO, Cl, SO₃H (azo) | OH, HO, O₂N, pyrazolone with SO₃H-phenyl, CH₃ (azo) | Brown. |

EXAMPLE 3

The dyestuff used is the chromium complex No. 17 of Table A; spun rayon is dyed according to Example 1 with one of the following products instead of with the highly methylated hexamethylolmelamine mentioned in Example 1:

|  | Parts |
|---|---|
| Aqueous solution of 75% strength of trimethylolmelamine trimethyl ether | 135 |
| Dimethylolurea | 100 |
| Aqueous solution of 50% strength of the methylol compound of glyoxal monoureine | 200 |
| Aqueous solution of 50% strength of the methylol compound of glyoxal diureine | 200 |

In each case grey dyeings are obtained which are fast to washing.

EXAMPLE 4

A cotton fabric is impregnated on a padder with one of the aqueous preparations Nos. 1 to 10 shown in the following Table C, the said preparations containing in 1000 parts by volume the substances listed under I to IV. In each case the impregnated fabric is dried in air and then cured for 6 minutes at 155 to 160° C., then washed for 5 minutes at 50° C. in a solution which contains in 1000 parts of water 2 parts of anhydrous sodium carbonate and 2 parts of an adduct from 9 mols of ethylene oxide with 1 mol of nonylphenol. The dyeings thus produced are fast to washing; the shade in each case is as shown in column V of the table.

TABLE C

| | I | II | III | IV | V |
|---|---|---|---|---|---|
| 1 | 20 parts of the dyestuff No. 17 of Table A. | 135 parts of an aqueous solution of 75% strength of trimethylolmelamine trimethyl ether. | 20 parts of a polyethylene emulsion of 20% strength. | 4 parts of ammonium chloride. | Grey. |
| 2 | do | 200 parts of an aqueous solution of 50% strength of tetramethylol acetylene diurea. | do | do | Do. |
| 3 | do | 200 parts of an aqueous solution of 50% strength of a mixture of dimethylolethylene urea and hexamethylolmelamine hexamethyl ether. | do | 4 parts of ammonium chloride or 20 parts of magnesium chloride. | Do. |
| 4 | do | 100 parts of dimethylol-trimethylolmelamine mixture soluble in cold water. | do | 20 parts of magnesium chloride. | Do. |
| 5 | 23 parts of the dyestuff No. 18 of Table A or 30 parts of the dyestuff No. 9 of Table B. | 100 parts of etherified hexamethylolmelamine containing an average of about 5 methyl ether groups per melamine molecule. | do | 4 parts of ammonium chloride. | Orange or brown. |
| 6 | 30 parts of the dyestuff No. 7 of Table B. | 110 parts of an aqueous solution of 60% strength of highly methylated hexamethylolmelamine and 50 parts of an aqueous solution of 50% strength of tetramethylol acetylene diurea. | do | 5 parts of ammonium chloride. | Brown. |
| 7 | do | 110 parts of an aqueous solution of 68% strength of highly methylated hexamethylolmelamine and 26 parts of a water-soluble methyl ether of a urea-formaldehyde condensate containing for every mol of urea about 2 mols of condensed formaldehyde. | do | do | Do. |
| 8 | do | 110 parts of an aqueous solution of 68% strength of highly methylated hexamethylolmelamine and 50 parts of an aqueous solution of 50% strength of a mixture of dimethylol ethylene urea and hexamethylolmelamine hexamethyl ether in the ratio of 1:1. | do | do | Do. |
| 9 | 20 parts of the dyestuff No. 18 of Table A and 5 parts of copper phthalocyanine-3:4′:4″:4‴-tetrasulfonic acid. | 145 parts of an aqueous solution of 69% strength of highly methylated hexamethylolmelamine. | do | 4 parts of ammonium chloride. | Do. |

EXAMPLE 5

A spun rayon fabric is impregnated on a padder with an aqueous preparation containing in 1000 parts by volume: 26 parts of the dyestuff No. 19 of Table A, 110 parts of an aqueous solution of 70% strength of highly methylated hexamethylolmelamine, 20 parts of an aqueous polyethylene emulsion of 20% strength and 5 parts of ammonium chloride. While still moist, the fabric is reeled, wrapped in a plastic foil and left to itself for 6 hours, then stretched on stenters, dried, and cured for 6 minutes at 155 to 160° C., and finally soaped. A red dyeing is obtained which is fast to washing and has considerably greater tinctorial strength than when the dyeing is performed without storage in the moist state but otherwise in identical manner.

EXAMPLE 6

An emulsion thickening is prepared in usual manner from:

| | Parts |
|---|---|
| Reaction product from 1 mol of oleyl alcohol and 80 mols of ethylene oxide, cross-linked with a small amount of hexamethylene diisocyanate | 100 |
| Water | 100 |
| Aqueous polyethylene emulsion of 20% strength | 11 |
| Aqueous solution of 75% strength of a methylolmelamine methyl ether containing per molecule of melamine 4 to 5 methylol groups and 2 to 3 etherified methylol groups | 145 |
| Lacquer benzine | 616 |
| Concentrated aqueous ammonia | 28 |
| | 1000 |

A printing paste is prepared from 920 parts of the above thickening, 40 parts of the dyestuff No. 19 of Table A and 40 parts of an aqueous solution of ammonium chloride of 25% strength, and this paste is used for printing a cotton fabric. The printed fabric is dried and then heated for 5 minutes at 150° C. A red print is obtained.

EXAMPLE 7

A mercerized cotton fabric is treated on a padder with an aqueous solution containing in 1000 parts by volume 20 parts of the 1:2-cobalt complex of the dyestuff of the formula

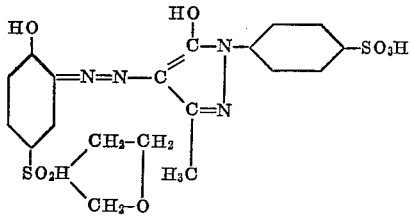

135 parts of an aqueous solution of 75% strength of highly methylated hexamethylolmelamine and 4 parts of ammonium chloride. The further procedure is the same as described in Example 1. The fabric is dyed a yellow-brown shade and has good fastness to washing and light.

Instead of the above dyestuff 20 parts of the 1:2-chromium complex of the formula

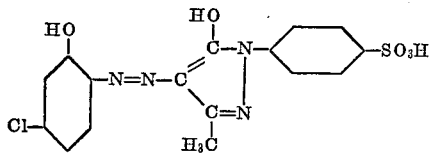

scarlet can be used.

What is claimed is:

1. A process for coloring fibrous material, which comprises impregnating the fibrous material with an aqueous preparation consisting essentially of (1) a water-soluble metal complex dyestuff selected from the group consisting of a 1:2-chromium complex of an azo dyestuff and a 1:2-cobalt complex of an azo dyestuff, the metal complex containing at least two sulfonic acid groups, wherein each of the two dyestuff molecules contains at least one sulfonic acid group, and substituents selected from the group consisting of hydrogen, lower alkyl, lower alkoxy, halogen and nitro, and (2) an aminoplast that is at least dispersible in water selected from the group consisting of a urea formaldehyde and a melamine formaldehyde condensation product, and (3) an acidic catalyst and then curing the fibrous material so treated.

2. A process for coloring cellulosic fibers which comprises impregnating the cellulosic fiber with an aqueous preparation which contains (1) a 1:2-chromium complex of an azo dyestuff which complex contains at least two sulfonic acid groups, wherein each of the two dyestuff molecules contains at least one sulfonic acid group and substituents selected from the group consisting of hydrogen, lower alkyl, lower alkoxy, halogen and nitro and (2) a methylated methylol melamine, and (3) an acidic catalyst and then curing the fibers so-treated.

3. A process for coloring cellulosic fibers which comprises impregnating the cellulosic fiber with an aqueous preparation which contains (1) a 1:2-cobalt complex of an azo dyestuff which complex contains at least two sulfonic acid groups wherein each of the two dyestuff molecules contains at least one sulfonic acid group and substituents selected from the group consisting of hydrogen, lower alkyl, lower alkoxy, halogen and nitro, and (2) a methylated methylol melamine, and (3) an acidic catalyst and then curing the fibers so-treated.

4. A process for coloring cellulosic fibers which comprises impregnating the cellulosic fiber with an aqueous preparation which contains (1) a 1:2-chromium complex of an azo dyestuff which complex contains at least two sulfonic acid groups, wherein each of the two dyestuff molecules contains at least one sulfonic acid group and substituents selected from the group consisting of hydrogen, lower alkyl, lower alkoxy, halogen and nitro, and (2) a methylated methylol urea, and (3) an acidic catalyst and then curing the fibers so-treated.

5. A process for coloring cellulosic fibers which comprises impregnating the cellulosic fiber with an aqueous preparation which contains (1) a 1:2-cobalt complex of an azo dyestuff which complex contains at least two sulfonic acid groups, wherein each of the two dyestuff molecules contains at least one sulfonic acid group and substituents selected from the group consisting of hydrogen, lower alkyl, lower alkoxy, halogen and nitro, and (2) a methylated methylol urea, and (3) an acidic catalyst and then curing the fibers so-treated.

6. A process for coloring fibrous material, which comprises impregnating the fibrous material with an aqueous preparation consisting essentially of (1) a water-soluble metal complex dyestuff selected from the group consisting of a 1:2-chromium complex of an azo dyestuff and a 1:2-cobalt complex of an azo dyestuff, the metal complex containing at least two sulfonic acid groups, wherein each of the two dyestuff molecules contains at least one sulfonic acid group, and substituents selected from the group consisting of hydrogen, lower alkyl, lower alkoxy, halogen and nitro, and (2) an aminoplast that is at least dispersible in water selected from the group consisting of a urea formaldehyde and a melamine formaldehyde condensation product, and (3) an acidic catalyst and then curing the fibrous material so treated at about 120°–180° C. for approximately 10–30 seconds.

7. A process for coloring cellulosic fibers which comprises impregnating the cellulosic fibers with an aqueous preparation which contains (1) a 1:2-chromium complex of an azo dyestuff which complex contains at least two sulfonic acid groups, wherein each of the two dyestuff molecules contains at least one sulfonic acid group and substituents selected from the group consisting of hydrogen, lower alkyl, lower alkoxy, halogen and nitro, and (2) a methylated methylol melamine, and (3) an acidic catalyst and then curing the fibers so-treated at about 120°–180° C. for approximately 10–30 seconds.

8. A process for coloring cellulosic fibers which comprises impregnating the cellulosic fibers with an aqueous preparation which contains (1) a 1:2-cobalt complex of an azo dye-stuff which complex contains at least two sulfonic acid groups wherein each of the two dyestuff molecules contains at least one sulfonic acid group and substituents selected from the group consisting of hydrogen, lower alkyl, lower alkoxy, halogen and nitro, and (2) a methylated methylol melamine, and (3) an acidic catalyst and then curing the fibers so-treated at about 120°–180° C. for approximately 10–30 seconds.

9. A process for coloring cellulosic fibers which comprises impregnating the cellulosic fibers with an aqueous preparation which contains (1) a 1:2-chromium complex of an azo dyestuff which complex contains at least two sulfonic acid groups, wherein each of the two dyestuff molecules contains at least one sulfonic acid group and substituents selected from the group consisting of hydrogen, lower alkyl, lower alkoxy, halogen and nitro, and (2) a methylated methylol urea, and (3) an acidic catalyst and then curing the fibers so-treated at about 120°–180° C. for approximately 10–30 seconds.

10. A process for coloring cellulosic fibers which comprises impregnating the cellulosic fibers with an aqueous preparation which contains (1) a 1:2-cobalt complex of an azo dyestuff which complex contains at least two sulfonic acid groups, wherein each of the two dyestuff molecules contains at least one sulfonic acid group and substituents selected from the group consisting of hydrogen, lower alkyl, lower alkoxy, halogen and nitro, and (2) a methylated methylol urea, and (3) an acidic catalyst and then curing the fibers so-treated at about 120°–180° C. for approximately 10–30 seconds.

References Cited

UNITED STATES PATENTS

| | | |
|---|---|---|
| 2,093,651 | 9/1937 | Widmer et al. |
| 2,416,884 | 3/1947 | Schreiber et al. |
| 3,030,353 | 4/1962 | Kuster. |
| 3,142,529 | 7/1964 | Freyermuth _____ 8—18 |

FOREIGN PATENTS

| | | |
|---|---|---|
| 814,288 | 6/1959 | Great Britain. |
| 848,637 | 9/1952 | Germany. |

OTHER REFERENCES

Colour Index, vol. 3, pp. 3074, 3069, pub. 1956, by Soc. Dyers Col., Yorkshire, England.

DONALD LEVY, Primary Examiner

U.S. Cl. X.R.

8—18, 42